(12) United States Patent
Wang et al.

(10) Patent No.: US 6,882,500 B2
(45) Date of Patent: Apr. 19, 2005

(54) AIRFLOW CHANNEL WITHIN A DISC DRIVE HOUSING

(75) Inventors: Peter F. Wang, Savage, MN (US); Stephen P. LeClair, Burnsville, MN (US); Jackson W. Nichols, Edmond, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 52 days.

(21) Appl. No.: 10/115,416

(22) Filed: Apr. 3, 2002

(65) Prior Publication Data

US 2003/0081350 A1 May 1, 2003

Related U.S. Application Data

(60) Provisional application No. 60/343,158, filed on Oct. 26, 2001.

(51) Int. Cl.[7] .......................... G11B 25/04; G11B 33/12
(52) U.S. Cl. .................................................. 360/97.02
(58) Field of Search ........................... 360/97.02, 97.03, 360/97.01, 98.01

(56) References Cited

U.S. PATENT DOCUMENTS

| | | | | |
|---|---|---|---|---|
| 4,471,395 A | * | 9/1984 | Beck et al. ............... | 360/97.03 |
| 4,473,855 A | | 9/1984 | Plotto et al. ................. | 360/104 |
| 4,489,356 A | * | 12/1984 | Farmer ..................... | 360/97.02 |
| 4,725,904 A | * | 2/1988 | Dalziel ..................... | 360/97.02 |
| 4,780,776 A | * | 10/1988 | Dushkes .................. | 360/97.03 |
| 4,879,618 A | | 11/1989 | Iida et al. ................. | 360/98.01 |
| 5,491,596 A | * | 2/1996 | Kobori ..................... | 360/97.02 |
| 5,898,545 A | | 4/1999 | Schirle ..................... | 360/97.02 |
| 5,907,453 A | | 5/1999 | Wood et al. .............. | 360/97.02 |
| 5,956,203 A | | 9/1999 | Schirle et al. ........... | 360/97.03 |
| 6,091,570 A | * | 7/2000 | Hendriks .................. | 360/97.03 |
| 6,147,834 A | | 11/2000 | Srikrishna et al. ........ | 360/97.02 |
| 6,208,484 B1 | | 3/2001 | Voights .................... | 360/97.02 |
| 6,369,977 B1 | | 4/2002 | Imai et al. ................ | 360/97.02 |
| 6,369,978 B1 | * | 4/2002 | Shimizu et al. ........... | 360/97.03 |
| 6,369,979 B1 | | 4/2002 | Wauke et al. ............. | 360/99.02 |
| 6,385,007 B1 | * | 5/2002 | Li ............................ | 360/97.02 |
| 6,628,475 B1 | * | 9/2003 | Nakamoto et al. ........ | 360/97.02 |

FOREIGN PATENT DOCUMENTS

| | | | | | |
|---|---|---|---|---|---|
| JP | 56101679 A | * | 8/1981 | ........... | G11B/25/04 |
| JP | 58212684 A | * | 12/1983 | ........... | G11B/25/04 |
| JP | 59203286 A | * | 11/1984 | ........... | G11B/25/04 |
| JP | 61151893 A | * | 7/1986 | ........... | G11B/33/14 |
| JP | 61280090 A | * | 12/1986 | ........... | G11B/33/14 |
| JP | 63070991 A | * | 3/1988 | ........... | G11B/33/14 |
| JP | 63211185 A | * | 9/1988 | ........... | G11B/33/14 |
| JP | 01217787 A | * | 8/1989 | ........... | G11B/33/14 |
| JP | 07320478 A | * | 12/1995 | ........... | G11B/33/14 |

\* cited by examiner

Primary Examiner—Craig A. Renner
(74) Attorney, Agent, or Firm—Westman, Champlin & Kelly, P.A.

(57) ABSTRACT

A base support member for a disc drive is provided. The base support member includes a disc support cavity configured to house and support a spinning disc, and a component support cavity configured to house and support a set of electrical and mechanical disc drive components. The base support member also includes at least one surface that defines an airflow channel that is generally disposed within the component support cavity of the base support member. The airflow channel has an inlet opening positioned in a first location proximate the disc support cavity and an outlet opening positioned in a second location proximate the disc support cavity. The airflow channel is configured to receive a flow of air from the spinning disc at the inlet opening and to discharge the flow of air at the outlet opening.

23 Claims, 7 Drawing Sheets

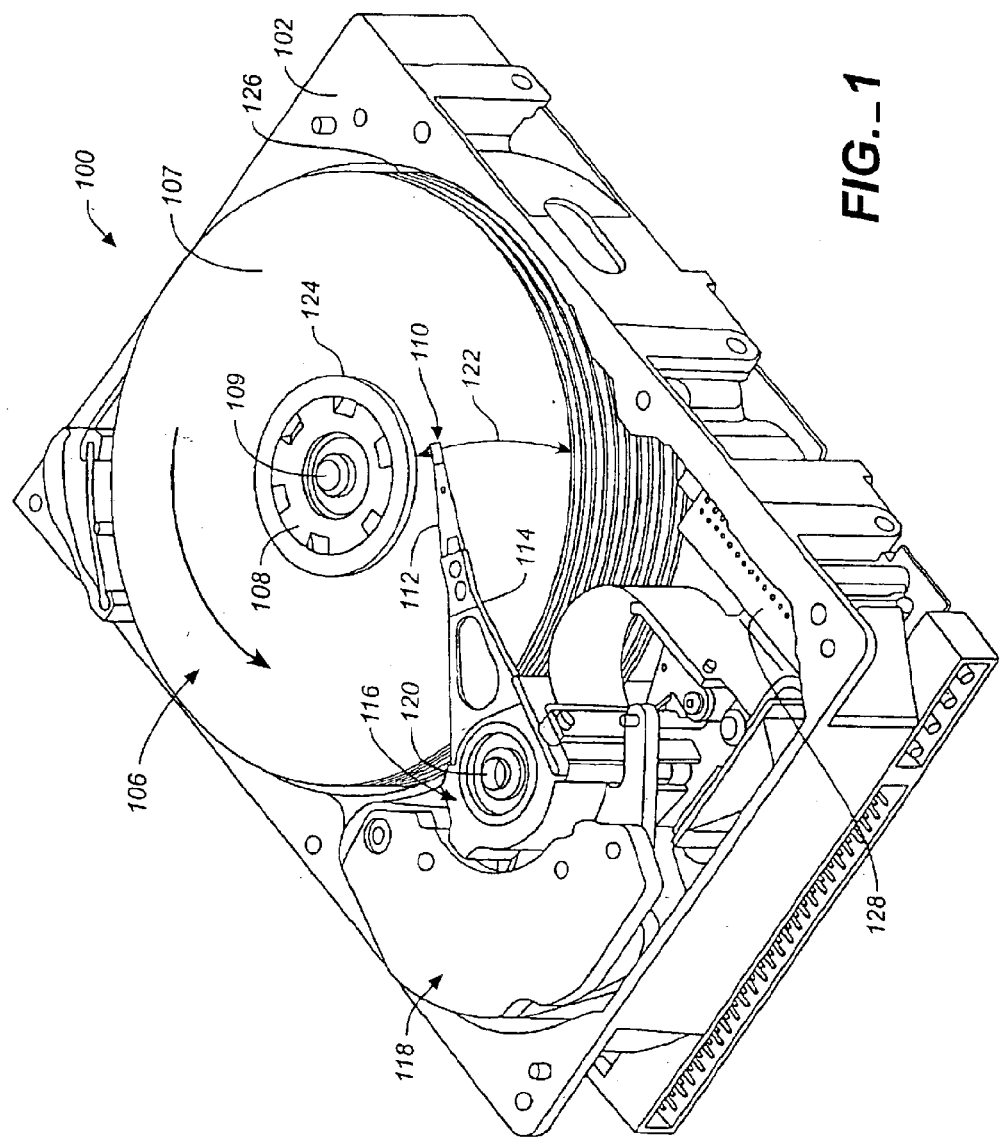
FIG._1

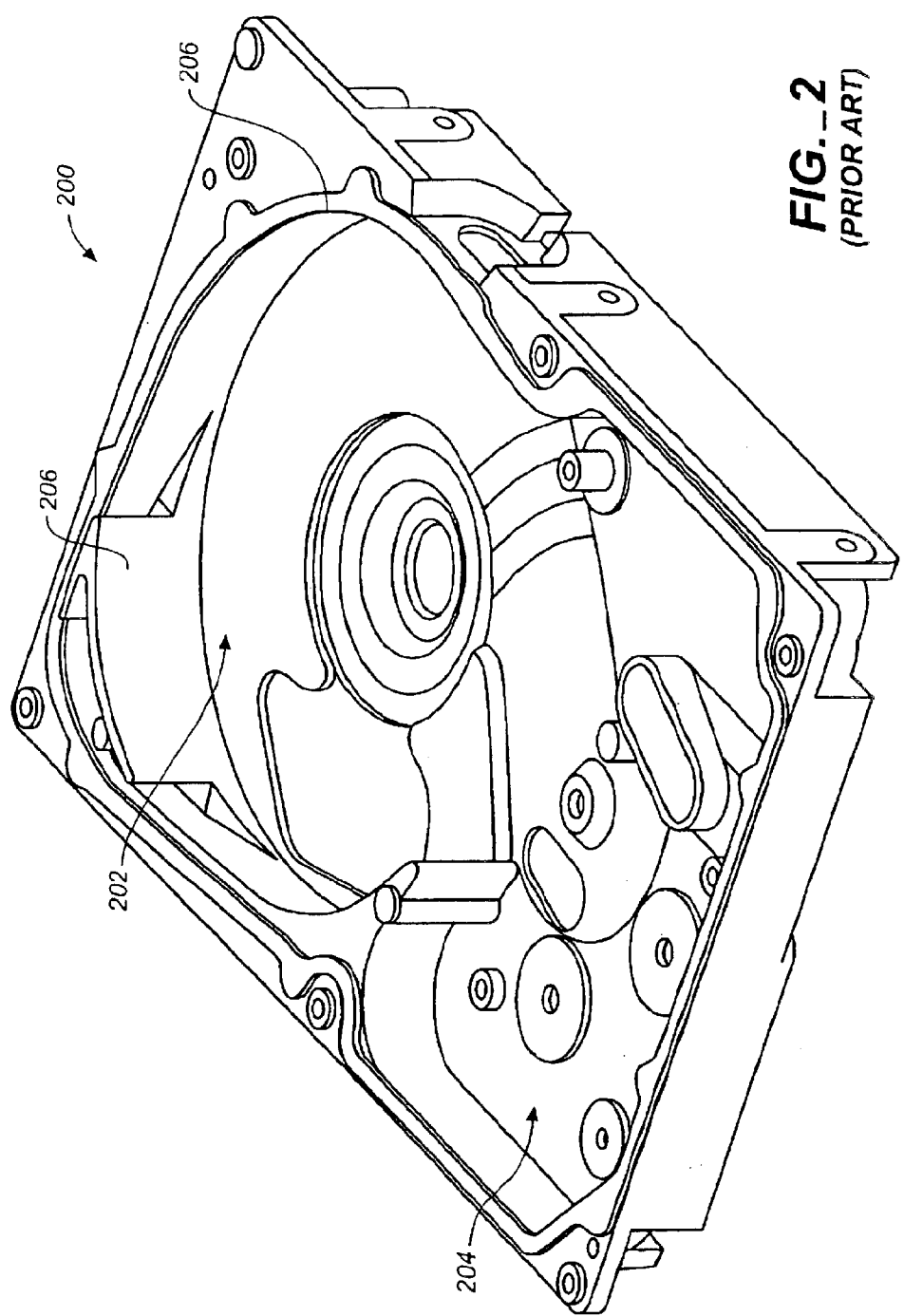
FIG._2
(PRIOR ART)

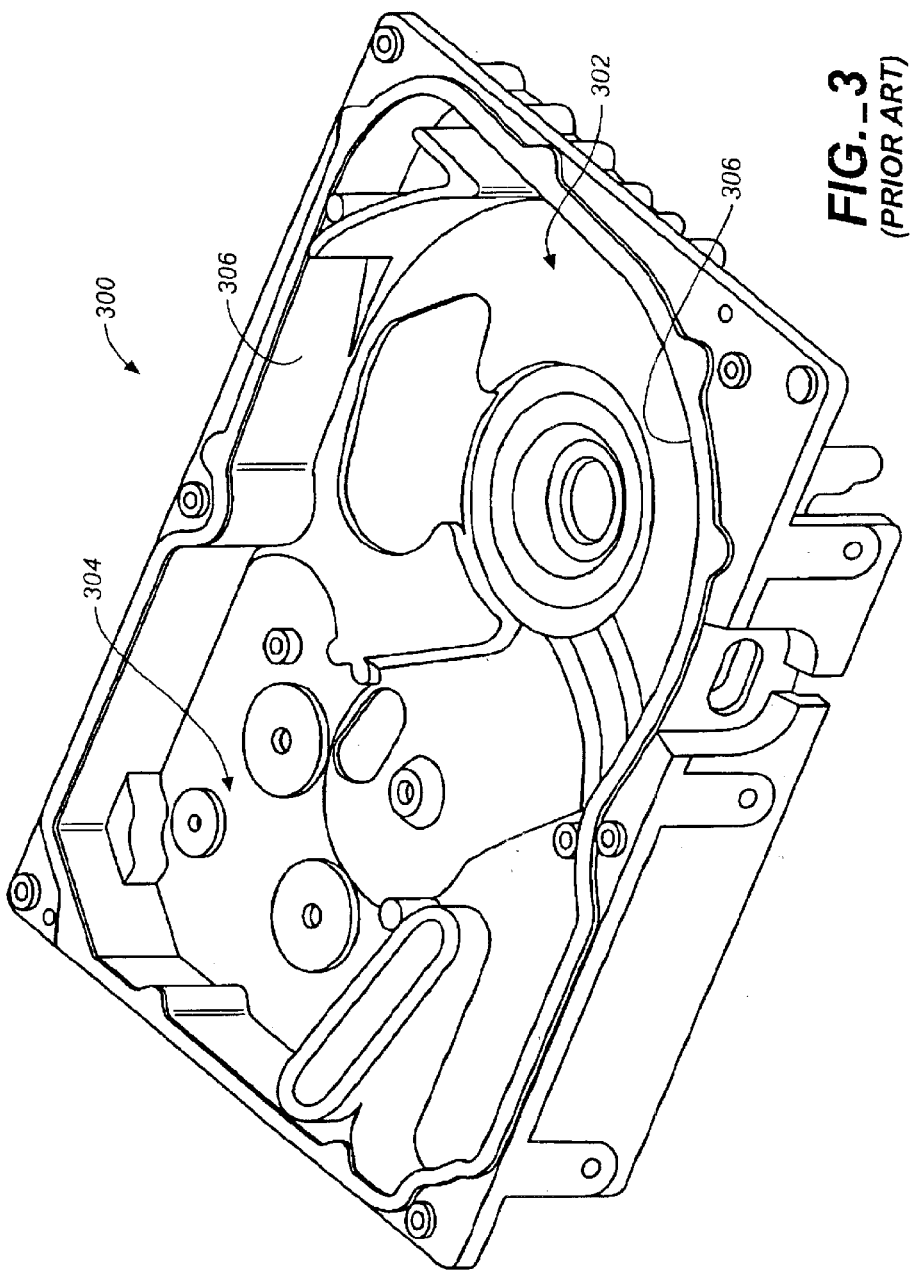
FIG._3
(PRIOR ART)

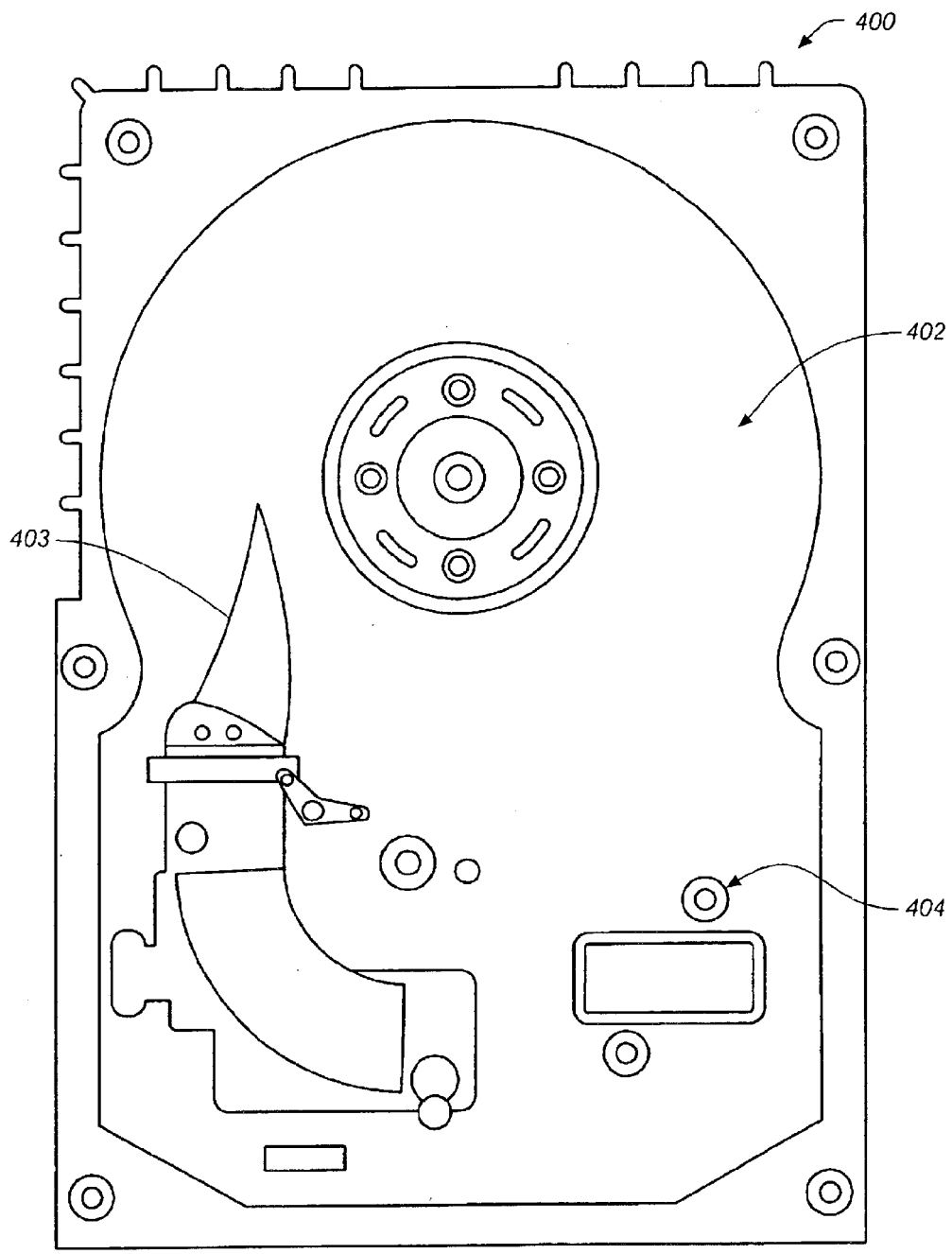
FIG._4
*(PRIOR ART)*

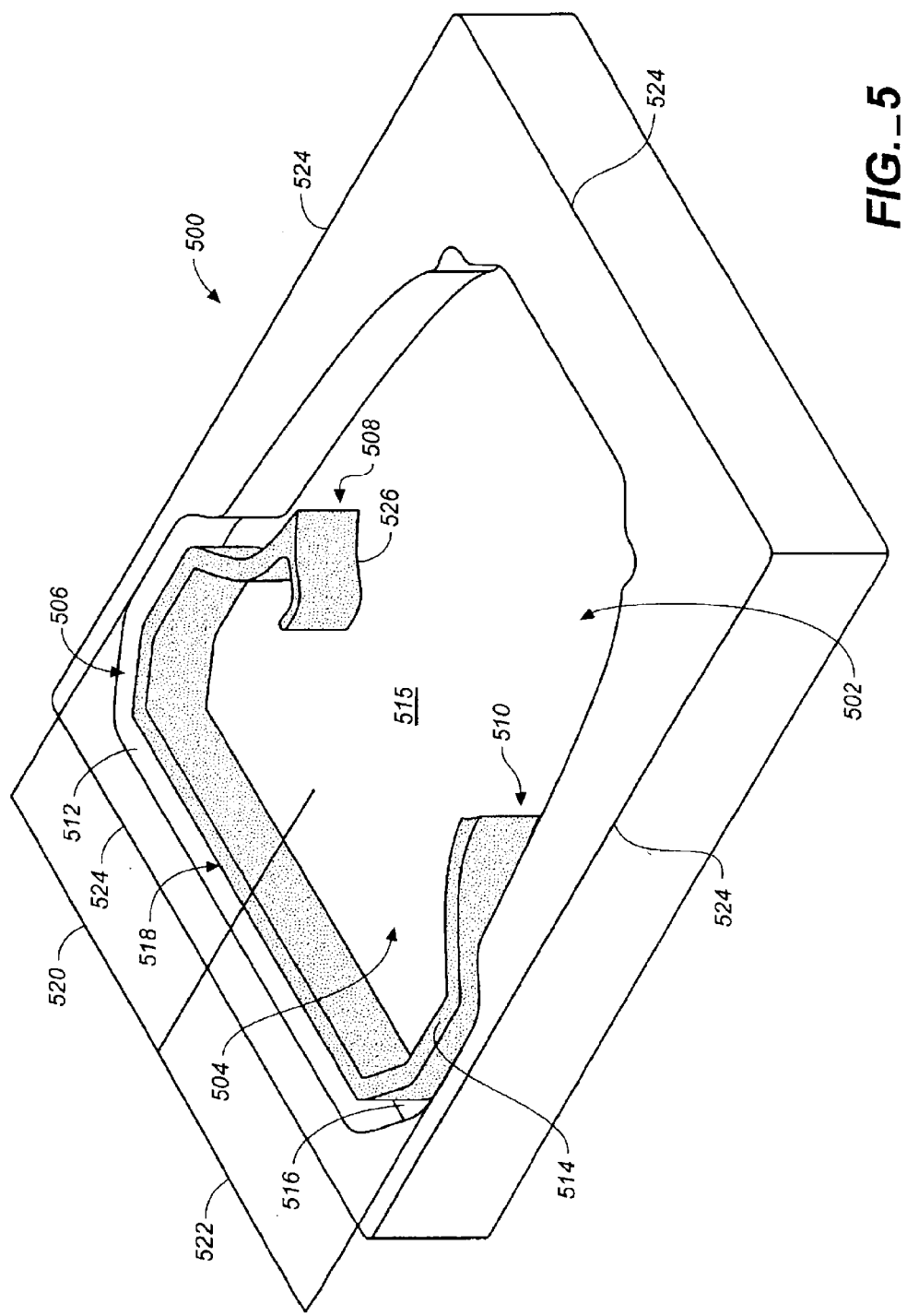
FIG._5

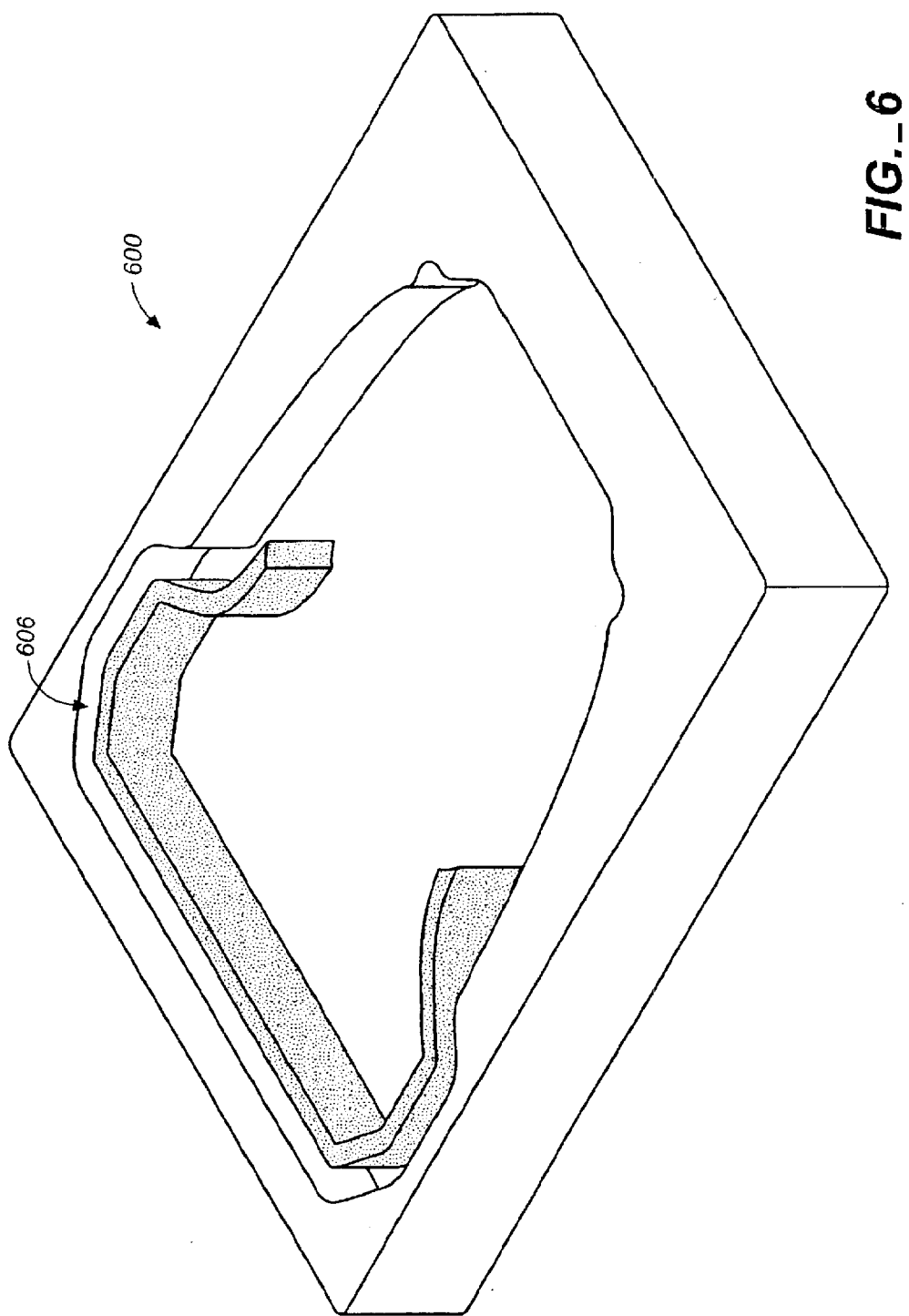

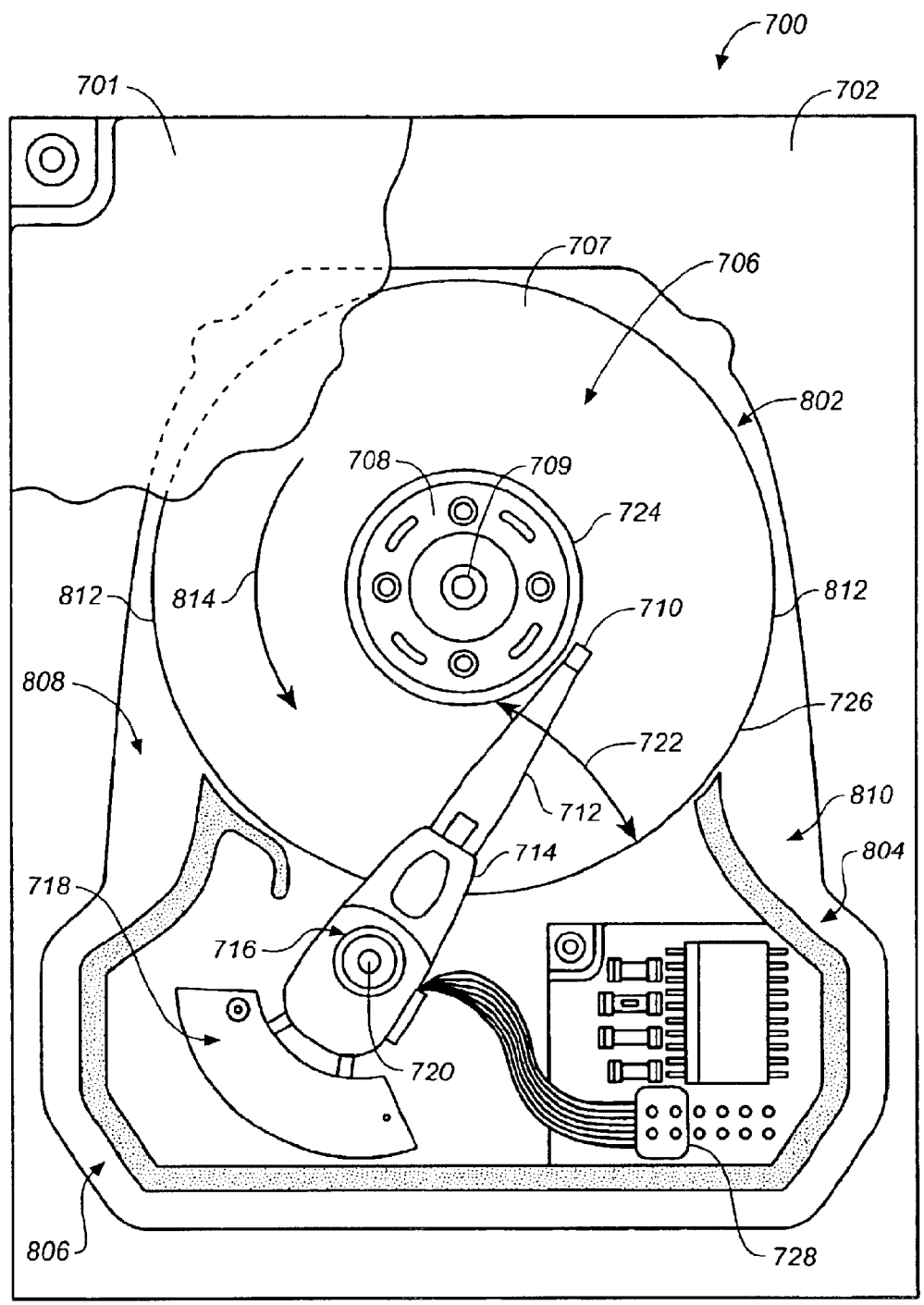
FIG._7

AIRFLOW CHANNEL WITHIN A DISC DRIVE HOUSING

CROSS-REFERENCE TO RELATED APPLICATION

This application claims priority from U.S. Provisional Application 60/343,158 filed on Oct. 26, 2001 and entitled Coil/Yoke Shielding and Air Bypassing Channel.

FIELD OF THE INVENTION

The present invention relates generally to the field of data processing systems, and more particularly but not by limitation to disc drive data storage devices.

BACKGROUND OF THE INVENTION

Within data processing systems, disc drives are often used as data storage devices. A typical disc drive includes a rigid housing or deck that encloses a variety of disc drive components. The components include one or more discs having data surfaces that are coated with a magnetizable medium for storage of digital information in a plurality of circular, concentric data tracks. The discs are mounted on a spindle motor that causes the discs to spin and the data surfaces of the discs to pass under respective hydrodynamic or aerodynamic bearing disc head sliders. The sliders carry transducers, which write information to and read information from the data surfaces of the discs.

An actuator mechanism moves the sliders from track-to-track across the data surfaces of the discs. The actuator mechanism includes a motor, such as a voice coil motor, that is generally disassociated from the discs in terms of its relative position within the disc drive housing. The actuator mechanism also includes, for each slider, a track accessing arm and a suspension. The slider is connected to the suspension. The suspension is connected to one end of the track accessing arm. The other end of the track accessing arm is operably connected to the motor. Under the control of electronic circuitry, the motor is operated so as to move the track accessing arm and its related suspension. In this way, each slider is moved from track-to-track across the data surface of a disc.

Within disc drives that include more than one disc, a single track accessing arm can be positioned between two discs, and two suspensions can be connected to the single track accessing arm. Accordingly, each of the two suspensions is connected to a separate slider. One of the sliders is configured to facilitate transfers of data to and from a bottom data surface of one disc, while the other slider is configured to facilitate transfers of data to and from a top data surface of another disc.

Each suspension typically includes a load beam and a gimbal. The load beam provides a load force that forces the slider toward the disc surface. The gimbal is positioned between the slider and the load beam, or is integrated into the load beam, to provide a resilient connection that allows the slider to pitch and roll while following topography of the data surface of a disc.

The slider typically includes a bearing surface, which faces the data surface of a disc. As the disc rotates, the disc drags air under the slider and along the bearing surface in a direction approximately parallel to the tangential velocity of the disc. As the air passes beneath the bearing surface, air compresses along the air flow path and causes the air pressure between the disc and the bearing surface to increase. This increase in air pressure creates a hydrodynamic or aerodynamic lifting force that counteracts the load force and causes the slider to lift and fly above or in close proximity to the data surface of the disc.

With increasing disc capacity and evolving disc drive performance requirements, it has become desirable, under certain circumstances, to increase the rotational speed of the discs in the disc drive. During disc drive operation, increases in disc rotational speed can cause the sensitive transducer-carrying sliders to experience undesirable turbulence and increased resonant amplitude due to windage-related excitation of the sliders themselves, as well as windage-related excitation of the discs, the actuator mechanism and other mechanical parts located within the disc drive housing.

One way to reduce windage-related interference is to include a shroud around the disc pack so as to significantly confine airflow to the disc pack area. The structure of the track accessing arms, however, generally prevents the inclusion of a shroud that surrounds the disc pack in its entirety. The structure of the actuator mechanism therefore complicates the concept of a complete shroud.

Many known disc drive designs allow, and in some instances encourage, the flow of air out of the disc pack area towards the various mechanical and electrical components of the disc drive. This flow of air towards the disc drive electrical and mechanical components outside of the disc pack area can cause the slider to experience considerable windage-induced turbulence. In addition, air that escapes the disc pack area is typically able to indiscriminately re-enter the disc pack area, thereby causing the slider to experience additional windage-induced turbulence on a somewhat random basis. Regardless of its source, windage-induced turbulence can have a negative impact on slider performance during critical read-write operations.

Some known disc drive designs actively encourage air to flow out of the disc pack area. The rationale behind several of these designs is to enable a cooling of various temperature-sensitive disc drive components, such as a voice coil motor portion of an actuator mechanism. With recent developments, including advances in coil temperature control, temperature can be effectively influenced without reliance on airflow-oriented cooling solutions, which can compromise slider performance.

Embodiments of the present invention provide solutions to these and other problems, and offer other advantages over the prior art.

The present invention relates to data storage devices that include housing features that influence airflow during device operation, wherein said features address at least the above-mentioned problems.

One embodiment of the present invention pertains to a base support member for a disc drive. The base support member includes a disc support cavity configured to house and support a spinning disc, and a component support cavity configured to house and support a set of electrical and mechanical disc drive components. The base support member also includes at least one surface that defines an airflow channel that is generally disposed within the component support cavity of the base support member. The airflow channel has an inlet opening positioned in a first location proximate the disc support cavity and an outlet opening positioned in a second location proximate the disc support cavity. The airflow channel is configured to receive a flow of air from the spinning disc at the inlet opening and to discharge the flow of air at the outlet opening.

Another embodiment pertains to a method of channeling airflow created by a disc that is configured to rotate within a housing of a disc drive. The method includes the steps of forming the housing, providing an airflow inlet opening within the housing and positioning the airflow inlet opening in a first location proximate an outside diameter of the disc. The method also includes the steps of providing an airflow outlet opening within the housing and positioning the airflow outlet opening in a second location proximate the outside diameter of the disc, the first location being displaced along the outside diameter from the second location. In addition, the method includes the steps of providing an airflow path within the housing and positioning the airflow path so as to provide airflow communication between the airflow inlet opening and the airflow outlet opening.

Another embodiment pertains to a disc drive that includes a rotatable storage disc and a disc head slider adapted to access data stored on a surface of the disc. The disc drive also includes an actuator mechanism for moving the disc head slider across the surface of the disc. The disc drive further includes read/write circuitry, which is coupled to the disc head slider. In addition, the disc drive includes a base support member for supporting the disc, actuator mechanism, disc head slider and read/write circuitry. The disc drive also includes means for guiding airflow within the base support member during operation of the disc drive.

Other features and benefits that characterize embodiments of the present invention will be apparent upon reading the following detailed description and review of the associated drawings.

BRIEF DESCRIPTION OF THE DRAWINGS

FIG. 1 is an isometric view of a disc drive.

FIG. 2 is a perspective view of a base support member for a disc drive, as is known in the prior art.

FIG. 3 is a perspective view of a base support member for a disc drive, as is known in the prior art.

FIG. 4 is a perspective view of a base support member for disc drive, as is known in the prior art.

FIG. 5 is a perspective view of a base support member.

FIG. 6 is a perspective view of a base support member.

FIG. 7 is a top plan view of a disc drive.

DETAILED DESCRIPTION OF ILLUSTRATIVE EMBODIMENTS

The present invention provides various embodiments of a new airflow channel mechanism within a disc drive housing. The new airflow channel mechanism reduces the amount of airflow that is guided directly at disc head sliders and their suspension systems using disc drive operation. In addition, the new airflow channel mechanism reduces the amount of air that is allowed to circulate towards sensitive mechanical and electrical disc drive components during disc drive operation. Further, the new airflow channel mechanism reduces the amount of airflow that is allowed to indiscriminately exit and reenter the disc pack region during disc drive operation. Generally speaking, the new airflow channel mechanism is configured to intercept airflow from a location "upstream" of the disc head sliders, to channel the air-flow around sensitive mechanical and electrical disc drive components, and to discharge the airflow in a location "downstream" of the disc head sliders.

FIG. 1 is an isometric view of a disc drive 100 in which embodiments of the present invention are useful. Disc drive 100 includes a housing with a base support member 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface. The read/write head can include any type of transducing head, such as an inductive head, a magneto-resistive head, an optical head or a magneto-optical head for example.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 is driven by servo electronics 128 based on signals generated by sliders 110 and a host computer (not shown). Other types of actuators can also be used, such as linear actuators.

During operation, as discs 107 rotate, the discs drag air under the respective sliders 110 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic or aerodynamic lifting force that counteracts the load force provided by suspensions 112 and causes the sliders 110 to lift and fly above or in close proximity to the disc surfaces.

Base support member 102 is illustratively a rigid housing that holds the various internal features of disc drive 100. During operation of disc drive 100, the rotation of discs 107 induces significant air movement within base support member 102. This air movement can cause sliders 110 to experience windage-induced turbulence, thereby compromising the flight performance of the sliders and the data transfer effectiveness of their associated read/write heads. Some of the turbulence experienced by sliders 110 results when the rotation of discs 107 causes air to be temporarily thrust out of the disc pack 106 area and allowed to indiscriminately re-enter the disc pack 106 area. Also, sliders 110 can experience an increased resonant amplitude as a result of windage-induced excitation of mechanical components, such as discs 107, voice coil motor 118, actuator 116, track accessing arms 114, suspensions 112 and other mechanical parts within base support member 102. As disc drive spindle speeds are increased in order to increase the speed at which discs 107 rotate, the likelihood that sliders 110 will experience significant windage-induced turbulence also increases.

One way to reduce windage-induced error is to include a shroud feature around the disc pack. The structure of the track accessing arms of the actuator mechanism, however, generally prohibits the extension of a shroud feature around the disc pack in its entirety. In addition, having a shroud around the disc pack in its entirety would significantly increase the load placed on the spindle motor, which rotates the disc. Prior art base support members have incorporated a shroud feature around significant portions of the disc pack, with gaps left to accommodate mechanical components of the disc drive. In some instances, the coverage and extension of the shroud member has been specifically elected to reduce or optimize the load placed on the spindle motor.

FIG. 2 is perspective view of a known base support member 200. Base support 200 is configured for incorporation into a disc drive system. For example, base support member 200 could be substituted for base support member 102 within disc drive 100 (FIG. 1). Base support member 200 has a disc support cavity 202 configured to house and support at least one rotatable disc. Also included is a component support cavity 204 configured to house and support certain components of an associated disc drive, such as a voice coil motor, an actuator pivot shaft and servo electronics. Base support member 200 further includes a shroud feature 206. Shroud feature 206 partially encloses the disc support cavity 202, but a significant gap is left open in areas proximate to component support cavity 204.

It should be pointed out that cavities 202 and 204 have general and not absolute boundaries. For example, a disc or discs supported within cavity 202 could overlap into cavity 204. Similarly, a component stored within cavity 204 could overlap into cavity 202.

When base support member 200 is utilized within an operational disc drive system, the rotation of the disc or discs housed within support cavity 202 will cause air to be temporarily thrust out of cavity 202 and into component support cavity 204. That same air is allowed to indiscriminately re-enter disc support cavity 202, potentially having an adverse effect on the performance of disc head sliders and their associated transducers operating within the disc drive system. Also, when air flows out of disc support cavity 202 and into component support cavity 204, a slider may experience an increased resonant amplitude as a result of windage-induced excitation of the disc drive's sensitive mechanical components (e.g., the discs, the voice coil motor, the actuator, the track accessing arms, the suspensions and other mechanical parts). In addition, shroud feature 206 will inherently guide a significant amount of airflow directly at the disc head sliders and their sensitive suspension systems, which could potentially have an adverse effect on slider performance.

Base support members having an upstream windage bypass design are known in the art and are generally designed to reduce the direct impact of windage on sliders and their suspensions. FIG. 3 is perspective view of a known base support member 300. Base support 300 is configured for incorporation into a disc drive system. For example, base support member 300 could be substituted for base support member 102 within disc drive 100 (FIG. 1).

Base support member 300 has a disc support cavity 302 configured to house and support at least one rotatable disc. Also included is a component support cavity 304 configured to house and support components of an associated disc drive, such as a voice coil motor, an actuator pivot shaft and servo electronics. Base support member 300 further includes a bypass feature 306. A significant opening exists between cavities 302 and 304. The opening between cavities 302 and 304 is even larger than the opening included in base support member 200 (FIG. 2).

It should be pointed out that cavities 302 and 304 have general and not absolute boundaries. For example, a disc or discs supported within cavity 302 could overlap into cavity 304. Similarly, a component stored within cavity 304 could overlap into cavity 302.

The design of base support member 300 enables some direct airflow to be channeled away from the disc head sliders and their sensitive suspension systems. The channeled airflow, however, is subsequently allowed, and even encouraged, to circulate towards sensitive mechanical disc drive components. Accordingly, the channeled airflow can cause the disc head sliders to experience turbulence, thereby having a negative impact on slider flight performance. In addition, the channeled air is able to indiscriminately re-enter cavity 302, which is disadvantageous to slider performance.

FIG. 4 is perspective view of a known base support member 400. Base support 400 is configured for incorporation into a disc drive system. For example, base support member 400 could be substituted for base support member 102 within disc drive 100 (FIG. 1). Base support member 400 has a disc support cavity 402 and a component support cavity 404.

It should be pointed out that cavities 402 and 404 have general and not absolute boundaries. For example, a disc or discs supported within cavity 402 could overlap into cavity 404. Similarly, a component stored within cavity 404 could overlap into cavity 402.

Base support member 400 includes upstream air bypassing feature 403. Feature 403 is configured to channel air out of cavity 402 and into cavity 404. Feature 403 will enable some direct airflow to be channeled away from the disc head sliders and their sensitive suspension systems, however, the bypassing airflow will then circulate towards the sensitive mechanical disc drive components, which, for reasons explained above, can have a negative impact on slider flight performance. In addition, the channeled air is able to indiscriminately re-enter cavity 402, which for reasons discussed above is disadvantageous.

FIG. 5 is perspective view of a base support member 500 for a disc drive, in accordance with an illustrative embodiment of the present invention. Base support 500 is configured for incorporation into a disc drive system. For example, base support member 500 could be substituted for base support member 102 within disc drive 100 (FIG. 1).

Base member 500 includes a disc support cavity 502 configured to house and support at least one rotatable disc. During operation of an associated disc drive system, the disc (or discs) spin or rotate about an axis in a manner similar to discs 107 described above in relation to FIG. 1. Base member 500 also includes a component support cavity 504, which is configured to house and support a set of electrical and mechanical disc drive components that could include, among other components, a voice coil motor and servo electronics, similar to those described above in relation to FIG. 1.

It should be pointed out that cavities 502 and 504 have general and not absolute boundaries. For example, a disc or discs supported within cavity 502 could overlap into cavity 504. Similarly, a component stored within cavity 504 could overlap into cavity 502.

Base support member 500 further comprises an airflow channel 506 that is generally disposed within component support cavity 504, but may, without departing from the scope of the present invention, extend into cavity 502. Airflow channel 506 has an inlet opening 508 positioned in a first location proximate disc supporting cavity 502 and an outlet opening 510 positioned in a second location proximate disc supporting cavity 502. Airflow channel 506 is generally configured to channel a flow of air that is created by a spinning disc (or a discs) during operation of a disc drive system within which base support member 500 has been incorporated. Airflow channel 506 illustratively receives a flow of air from the spinning disc or discs at inlet opening 508, channels the air flow through channel 506, and discharges the flow of air at outlet opening 510.

Airflow channel 506 is partially formed by a wall 512 having an inwardly facing surface, wherein "inwardly,"

generally means towards the interior portions of base support member 500. As illustrated, wall 512 is integrally formed as part of base support member 500. In accordance with another embodiment, however, wall 512 is a separate component that is attached within component support cavity 504 of base support member 500. Airflow channel 506 is also partially formed by a wall 514 having an outwardly facing surface, wherein "outwardly," generally means towards the exterior portions of base support member 500. As illustrated, wall 514 is part of a protrusion 518 that is generally disposed within component support cavity 504. In accordance with one embodiment, protrusion 518 is an integrally formed part of base support member 500. In accordance with another embodiment, however, protrusion 518 is a separate component that is attached within component support cavity 504 of base support member 500.

Referring to FIG. 5, the inwardly and outwardly facing surfaces of walls 512 and 514 face one another, are spaced apart from one another, and cooperate to form the walls of airflow channel 506. Base support member 500 has an interior floor 515. Airflow channel 506 illustratively includes a floor portion 516. In accordance with one embodiment, floor portion 516 is generally contiguous and coplanar with floor 515. In accordance with one embodiment, when a top cover (not shown) is placed over base support member 500, air channel 506 has a top enclosure surface that is provided by that top cover.

It should be pointed out that airflow channel 506 may be formed utilizing structure other than the specifically illustrated channel. For example, airflow channel 506 could be formed utilizing a tubular member (having a single inner tubular surface) that is disposed within component support cavity 504. The tubular member could have inlet and outlet openings similar to the airflow channel pictured in FIG. 5. Similar airflow channels having other structural manifestations should also be considered within the scope of the present invention.

Component support cavity 504 illustratively has an actuator side 520 and an electronics side 522. Actuator side 520 is generally the side of component support cavity 504 where the voice coil motor is supported. Electronics side 522 is generally the side of component support cavity where the servo electronics are supported. Inlet opening 508 is generally positioned proximate disc support cavity 502 on actuator side 520 of component support cavity 504. Outlet opening 510 is generally positioned proximate disc support cavity 502 on electronics side 522 of component support cavity 504.

It should be pointed out that sides 520 and 522 have general and not absolute boundaries. For example, an actuator element generally supported on side 520 could overlap onto side 522. Similarly, an electronics element generally supported on side 522 could overlap onto side 520.

Base support member 500 illustratively includes a peripheral edge 524. In accordance with one embodiment, at least a portion of airflow channel 506 is generally disposed between peripheral edge 524 of base support member 500 and an actuating mechanism (e.g., a voice coil motor) supported on the actuator side 520 of component support cavity 504. In addition, another portion of airflow channel 506 is also generally disposed between peripheral edge 524 of base support member 500 and electrical components (e.g., servo electronics) supported on the electronics side 522 of component support cavity 504. Airflow channel 506 is generally disposed between the electrical and mechanical components stored within component support cavity 504 and peripheral edge 524 of base support member 500.

In accordance with another embodiment, configurations of inlet opening 508 and outlet opening 510 are switched to accommodate opposite disc rotation within a disc drive system that incorporates base support member 500 (e.g., inlet opening 508 is on electronics side 522). In accordance with yet another embodiment, inlet opening 508 is formed by surfaces so as to be aerodynamically shaped to encourage a pattern of airflow from a disc spinning within disc support cavity 502 to airflow channel 506.

In accordance with one embodiment, inlet opening 508 further comprises an optional shroud portion 526. Optional shroud portion 526 illustratively extends along the outside diameter of a disc supported within disc support cavity 502, and generally blocks at least a portion of an actuator mechanism (e.g., a voice coil motor) from direct exposure to disc air flow. Optional shroud portion 526 is not a critical element of the present invention but could be provided, for example, to reduce or optimize the spin load place on the spindle motor which is charged with rotating the discs supported within disc support cavity 502. Optional shroud portion 526 might also or alternatively be provided simply to shield certain components supported within component support cavity 504 from direct disc-generated air flow. The size and shape of airflow channel 506 and optional shroud portion 526 can be other than illustrated without departing from the scope of the present invention. Which sizes and shapes are most effective depends at least upon the nature, environment and characteristics of a given slider application.

FIG. 6 is a perspective view of a base support member 600. Base support member 600 is substantially similar to base support member 500, but does not include optional shroud portion 526. Elements in FIG. 6 that are the same or similar to the elements of the previously described embodiment the present invention have been given the same or similar reference numerals. Referring to base support member 600, the inlet does not include a shroud portion, but is illustratively aerodynamically designed to facilitate, enhance and encourage airflow through airflow channel 606, which is, except for the lack of the shroud portion, is significantly similar to airflow channel 506 (FIG. 5).

FIG. 7 is a top plan view of a disc drive 700 that illustratively incorporates an embodiment of the present invention. Elements in FIG. 7 that are the same or similar to the elements of the previously described embodiments the present invention have been given the same or similar reference numerals.

Disc drive 700 includes a housing with a base support member 702 and a top cover 701 (illustratively broken away to reveal internal drive 700 components). Disc drive 700 further includes a disc pack 706, which is mounted on a spindle motor (not shown) by a disc clamp 708. Disc pack 706 includes a plurality of individual discs 707, which are mounted for co-rotation about central axis 709. Each disc surface has an associated slider 710 which is mounted to disc drive 700 and carries a read/write head for communication with the disc surface. The read/write head can include any type of transducing head, such as an inductive head, a magneto-resistive head, an optical head or a magneto-optical head for example.

In the example shown in FIG. 7, sliders 710 are supported by suspensions 712 which are in turn attached to track accessing arms 714 of an actuator 716. The actuator shown in FIG. 1 is of the type known as a rotary moving coil actuator and includes a voice coil motor (VCM), shown generally at 718. Voice coil motor 718 rotates actuator 716 with its attached sliders 710 about a pivot shaft 720 to position sliders 710 over a desired data track along a path 722 between a disc inner diameter 724 and a disc outer diameter 726. Voice coil motor 718 is driven by servo electronics 728 based on signals generated by sliders 710 and a host computer (not shown). Other types of actuators can also be used, such as linear actuators.

During operation, as discs 707 rotate, the discs drag air under the respective sliders 710 and along their air bearing surfaces in a direction approximately parallel to the tangential velocity of the discs. As the air passes beneath the air bearing surfaces, air compression along the air flow path causes the air pressure between the discs and the air bearing surfaces to increase, which creates a hydrodynamic or aerodynamic lifting force that counteracts the load force provided by suspensions 712 and causes the sliders 710 to lift and fly above or in close proximity to the disc surfaces. It should be pointed out that disc drive 700 could, without departing from the scope of the present invention, include disc drive-related components other than those illustrated.

Base member 702 of disc drive 700 includes a disc support cavity 802 configured to house and support at least one rotatable disc. During operation of an associated disc drive system, the disc (or discs) spin or rotate about an axis in a manner similar to discs 107 described above in relation to FIG. 1. Base member 702 also includes a component support cavity 804, which is configured to house and support a set of electrical and mechanical disc drive components that could include, among other components, a voice coil motor and servo electronics, similar to those described above in relation to FIG. 1.

It should be pointed out that cavities 802 and 804 have general and not absolute boundaries. For example, disc(s) 707 is generally supported within cavity 802 but overlaps into cavity 804. A component stored within cavity 804 could similarly overlap into cavity 802.

Base support member 702 further comprises an airflow channel 806 that is generally disposed within component support cavity 804. Airflow channel 806 is illustratively configured and structured in a way that is substantially to the configuration and structure of airflow channel 506 in FIG. 5. Airflow channel 806 has an inlet opening 808 positioned in a first location proximate disc supporting cavity 802 and an outlet opening 810 positioned in a second location proximate disc supporting cavity 802. Airflow channel 806 is generally configured to channel a flow of air that is created by a spinning disc (or a discs) during operation of a disc drive 700. Airflow channel 806 illustratively receives a flow of air from the spinning disc or discs at inlet opening 808, channels the air flow through channel 806, and discharges the flow of air at outlet opening 810.

In accordance with one embodiment, inlet opening 808 is positioned in a first location proximate an outside diameter 812 of a disc 707. Outlet opening 810 is positioned in a second location proximate the outside diameter 812 of the disc 707. The disc 707 illustratively spins in a counter-clockwise rotation, along an arrow 814, and inlet opening 808 therefore precedes outlet opening 810 relative to rotation of the disc 707. Accordingly, airflow through airflow channel 806 is illustratively in the same direction as the disc, in the counter-clockwise direction. In accordance with one embodiment, inlet opening 808 receives a flow of air in a location that is "upstream" from slider (or sliders) 110, channels that airflow through airflow channel 806, and discharges the airflow out outlet 810 in a location that is "downstream" from slider (or sliders) 110.

The airflow channels illustrated in FIGS. 5, 6 and 7 are advantageous in that they reduce the amount of direct airflow that is directly guided at the disc head sliders and their sensitive suspension systems. In addition, they reduce the amount of air that is allowed to circulate towards sensitive mechanical and electrical disc drive components. Also, they reduce the amount of airflow that is allowed to indiscriminately exit and re-enter the disc pack region. Air flow is intercepted "upstream" of the disc head sliders, channeled around sensitive mechanical and electrical disc drive components, and discharged in a location "downstream" of the disc head sliders.

In summary, one embodiment of the present invention pertains to a base support member (500, 600, 702) for a disc drive (700). The base support member (500, 600, 702) includes a disc support cavity (502, 802) configured to house and support a spinning disc (707), and a component support cavity (504, 804) configured to house and support a set of electrical and mechanical disc drive components (716, 718, 720, 728). The base support member (500, 600, 702) also includes at least one surface that defines an airflow channel (506, 606, 806) that is generally disposed within the component support cavity (504, 804) of the base support member (500, 600, 702). The airflow channel (506, 606, 806) has an inlet opening (508, 808) positioned in a first location proximate the disc support cavity (502, 802) and an outlet opening (510, 810) positioned in a second location proximate the disc support cavity (502, 802). The airflow channel (506, 606, 806) is configured to receive a flow of air from the spinning disc (707) at the inlet opening (508, 808) and to discharge the flow of air at the outlet opening (510, 810).

Another embodiment pertains to a method of channeling airflow created by a disc (707) that is configured to rotate within a housing (500, 600, 702 and related top covers, e.g., top cover 701) of a disc drive (700). The method includes the steps of forming the housing (500, 600, 702 and related top covers, e.g., top cover 701), providing an airflow inlet opening (508, 608) within the housing (500, 600, 702 and related top covers, e.g., top cover 701) and positioning the airflow inlet opening (508, 608) in a first location proximate an outside diameter (812) of the disc (707). The method also includes the steps of providing an airflow outlet opening (510, 810) within the housing (500, 600, 702 and related top covers, e.g., top cover 701) and positioning the airflow outlet opening (510, 810) in a second location proximate the outside diameter (812) of the disc (707), the first location being displaced along the outside diameter (812) from the second location. In addition, the method includes the steps of providing an airflow path (506, 606, 806) within the housing (500, 600, 702 and related top covers, e.g., top cover 701) and positioning the airflow path (506, 606, 806) so as to provide airflow communication between the airflow inlet opening (508, 608) and the airflow outlet opening (510, 810).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for a disc drive housing while maintaining substantially the same functionality without departing from the scope and spirit of the present invention. In addition, although the preferred embodiment described herein is directed to a bypassing channel within a disc drive housing, it will be appreciated by those skilled in the art that the teachings of the present invention can be applied to other systems that employ similar types of housings, without departing from the scope and spirit of the present invention.

What is claimed is:

1. A base support member, comprising:
   a media support cavity configured to house and support a storage medium;
   a component support cavity configured to house and support a set of electrical and mechanical components; and
   a first wall having an outwardly facing surface that defines a continuous and uninterrupted airflow channel that is generally disposed within the component support cavity of the base support member and an inwardly facing surface that faces at least one of the set of electrical and mechanical components, and wherein the airflow channel has an inlet opening positioned in a first location proximate the media support cavity and an outlet opening positioned in a second location proximate the media support cavity such that the airflow channel commences or terminates proximate an outer edge of the storage medium, the airflow channel is configured to receive a flow of air at the inlet opening and to discharge the flow of air at the outlet opening.

2. The base support member of claim 1, wherein said base support member further comprises:
   a second wall having an inwardly facing surface, the outwardly facing surface of the first wall being spaced apart from and facing the inwardly facing surface of the second wall such that the outwardly and inwardly facing surfaces of the first and second walls cooperate to form the airflow channel there between.

3. The base support member of claim 2, wherein the second wall is integrally formed as part of the base support member.

4. The base support member of claim 2, wherein the first wall is part of a protrusion, the protrusion being an integrally formed part of the base support member.

5. The base support member of claim 2, wherein the first wall is part of a protrusion, the protrusion being attached to the base support member.

6. The base support member of claim 1, wherein:
   the component support cavity has an actuator side and an electronics side;
   the inlet opening of the airflow channel is generally positioned proximate the media support cavity on one of the actuator and electronics sides of the component support cavity; and
   the outlet opening of the airflow channel is generally positioned proximate the media support cavity on the other of the actuator and electronics sides of the component support cavity.

7. The base support member of claim 6, wherein the base support member further comprises:
   a peripheral edge;
   an actuating mechanism supported within the component support cavity on the actuator side thereof; and
   a set of electronic components supported within the component support cavity on the electronics side thereof, at least a portion of the airflow channel being generally disposed between the peripheral edge of the base support member and the actuating mechanism, and at least another portion of the airflow channel being generally disposed between the peripheral edge of the base support member and the set of electronic components.

8. The base support member of claim 1, wherein the inlet opening is aerodynamically shaped to encourage a pattern of airflow through the airflow channel.

9. The base support member of claim 1, wherein the inlet opening includes a shroud portion.

10. The base support member of claim 1, wherein the base support member further comprises:
    a peripheral edge; and
    the set of electrical and mechanical components supported within the component support cavity, the airflow channel being generally disposed between the peripheral edge and the set of electrical and mechanical components.

11. A storage system comprising:
    a base support member as described in claim 1; and
    a disc that is supported within the media support cavity, has an outside diameter and is rotatable about a central axis, wherein the inlet opening is positioned in a first location proximate the outside diameter of the disc and the outlet opening is positioned in a second location proximate the outside diameter of the disc, the first location preceding the second location relative to rotation of the disc.

12. The storage system of claim 11, wherein the disc is rotatably supported within the media support cavity and the airflow channel is generally disposed within the component support cavity.

13. The storage system of claim 12, wherein the storage system further comprises:
    a peripheral edge; and
    the set of electrical and mechanical components supported within the component support cavity, the airflow channel being generally disposed between the peripheral edge and the set of electrical and mechanical components.

14. The storage system of claim 12, wherein: the component support cavity has an actuator side and an electronics side; the inlet opening of the airflow channel is generally positioned proximate the outside diameter of the disc on one of the actuator and electronics sides of the component support cavity; and the outlet opening of the airflow channel is generally positioned proximate the outside diameter of the disc on the other of the actuator and electronics sides of the component support cavity.

15. The storage system of claim 14, wherein the storage system comprises:
    a peripheral edge of the base support member;
    an actuating mechanism supported within the component support cavity on the actuator side thereof; and
    a set of electronic components supported within the component support cavity on the electronics side thereof, the airflow channel being generally disposed between the peripheral edge of the base Support member and the actuating mechanism, and generally disposed between the peripheral edge of the base support member and the set of electronic components.

16. The storage system of claim 11, wherein the inlet opening is aerodynamically shaped to encourage a pattern of airflow into the airflow channel.

17. The storage system of claim 11, wherein the inlet opening includes a shroud portion.

18. A method of channeling airflow within a housing comprising:

providing an continuous and uninterrupted airflow channel defined by an outwardly facing surface of a wall, the wall having an inward facing surface that faces at least one of a set of electrical and mechanical components supported within the housing, the airflow channel having an airflow inlet opening positioned in a first location proximate a storage medium and an airflow outlet opening positioned in a second location proximate an outside perimeter of the storage medium, the first location being displaced along the outside perimeter from the second location; and guiding the airflow through the airflow channel from the airflow inlet opening to the airflow outlet opening.

19. The method of claim 18, wherein providing the airflow channel further comprises:

providing an airflow channel that is generally disposed between a peripheral edge of the housing and the set of electrical and mechanical components supported within a component support cavity of the housing.

20. The method of claim 18, and further comprising:

forming the housing so as to include a component support cavity and a media support cavity;

operatively securing the medium within the media support cavity of the housing; and wherein the airflow channel comprises providing an airflow path that generally extends around an outer proximity of the component support cavity.

21. The method of claim 20 further comprising a step of operatively suspending a slider over a surface of the medium, and wherein positioning the airflow outlet opening further comprises positioning the airflow outlet opening in a position that is generally downwind from the slider.

22. The method of claim 21, wherein positioning the airflow inlet opening further comprises positioning the airflow inlet opening in a position that is generally upwind from the slider.

23. A storage system comprising:

a base support member for supporting a storage medium; and continuous and uninterrupted surface means within the base support member for guiding airflow from an inlet proximate the storage medium to an outlet proximate the storage medium during operation of the storage system.

* * * * *